United States Patent [19]

Steadman

[11] Patent Number: 5,593,070
[45] Date of Patent: Jan. 14, 1997

[54] TRUCK MOUNTED TANK HAVING LOW CENTER OF GRAVITY

[75] Inventor: Gary E. Steadman, Sherwood Park, Canada

[73] Assignee: Quicksilver Manufacturing Ltd., Alberta, Canada

[21] Appl. No.: 384,863

[22] Filed: Feb. 7, 1995

[51] Int. Cl.$^6$ .................................................. B67D 5/64
[52] U.S. Cl. .................... 222/608; 220/DIG. 6; 280/838
[58] Field of Search ................ 222/608; 137/590; 220/DIG. 6; 280/838; 251/144

[56] References Cited

U.S. PATENT DOCUMENTS

| | | | |
|---|---|---|---|
| 1,343,812 | 6/1920 | Dickerson | 220/DIG. 6 |
| 2,339,303 | 1/1944 | Tillery | 220/DIG. 6 |
| 4,557,406 | 12/1985 | Olinger et al. | 220/DIG. 6 |
| 5,242,196 | 9/1993 | Borne | 280/838 X |
| 5,277,401 | 1/1994 | Butler et al. | 251/144 |

*Primary Examiner*—Gregory L. Huson
*Attorney, Agent, or Firm*—Sheridan Ross P.C.

[57] ABSTRACT

An elongate, closed, fiberglass tank of round or oval cross-section is mounted horizontally on a truck frame. An opening is provided in the bottom portion of the tank wall. A fiberglass sump projects downwardly from the opening and is joined with the bottom wall portion along the periphery of the opening. Liquid may drain from the tank compartment through the opening into the sump. The sump has a generally vertical wall segment at one end. The wall segment faces sideways and forms an outlet. The outlet is positioned above the rails of the truck frame. A discharge assembly, comprising a valve and piping, is connected to the vertical wall segment, communicates with the outlet and extends horizontally above the frame to the side of the tank. By incorporating this design, the tank can be positioned close to the frame and its discharge assembly still remains clear of the frame. The center of gravity of the tank is relatively low and the truck is less likely to overturn.

8 Claims, 4 Drawing Sheets

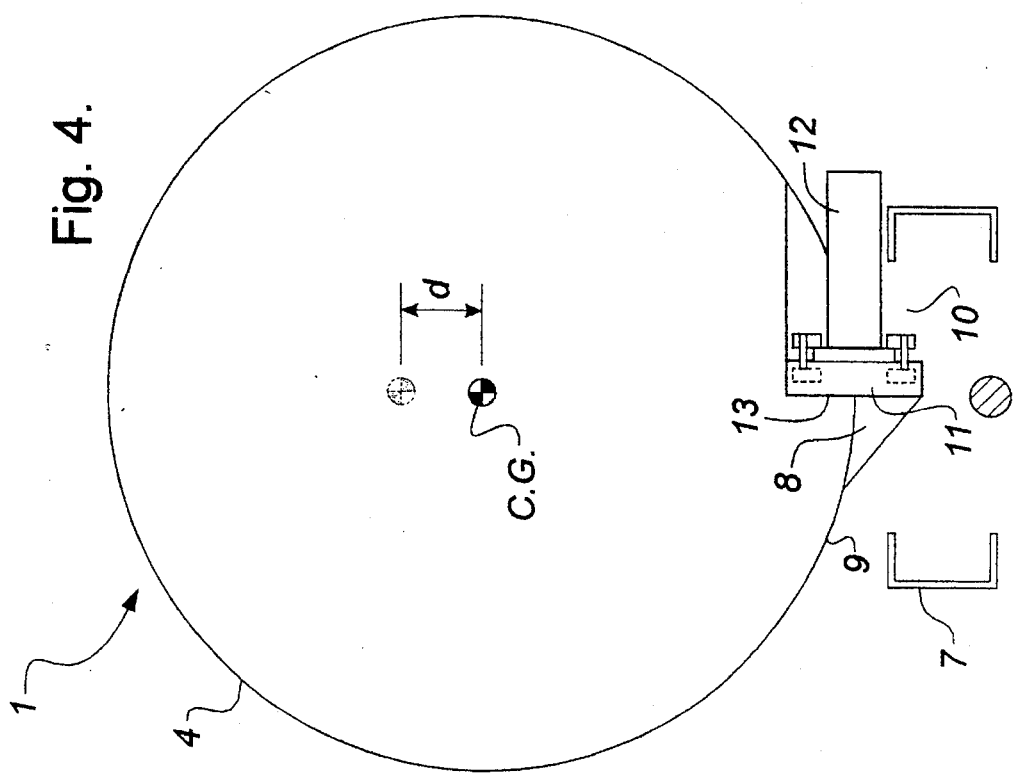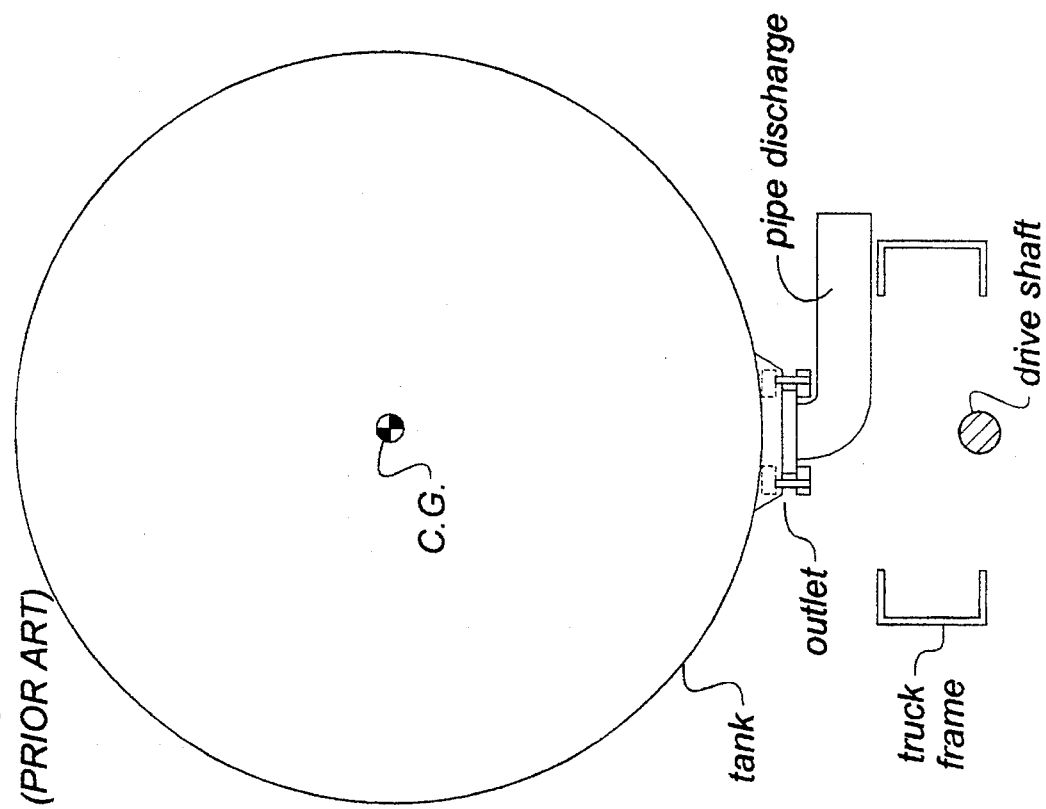

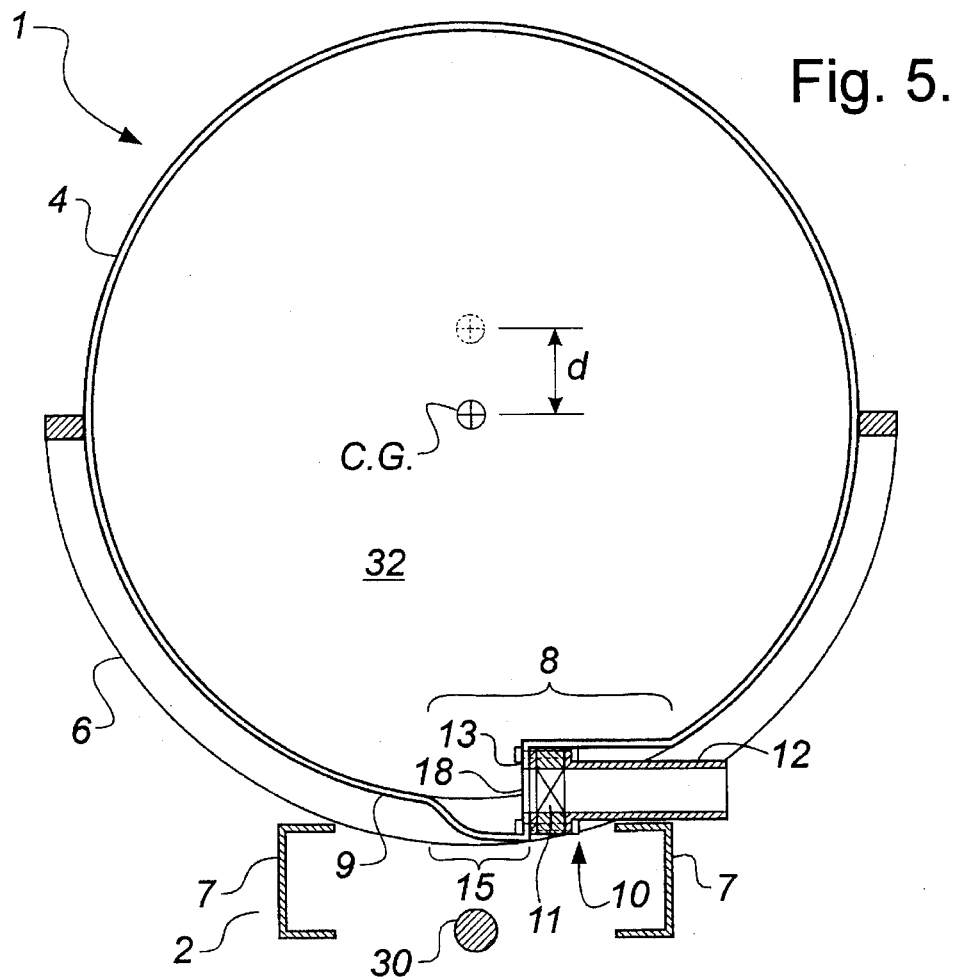
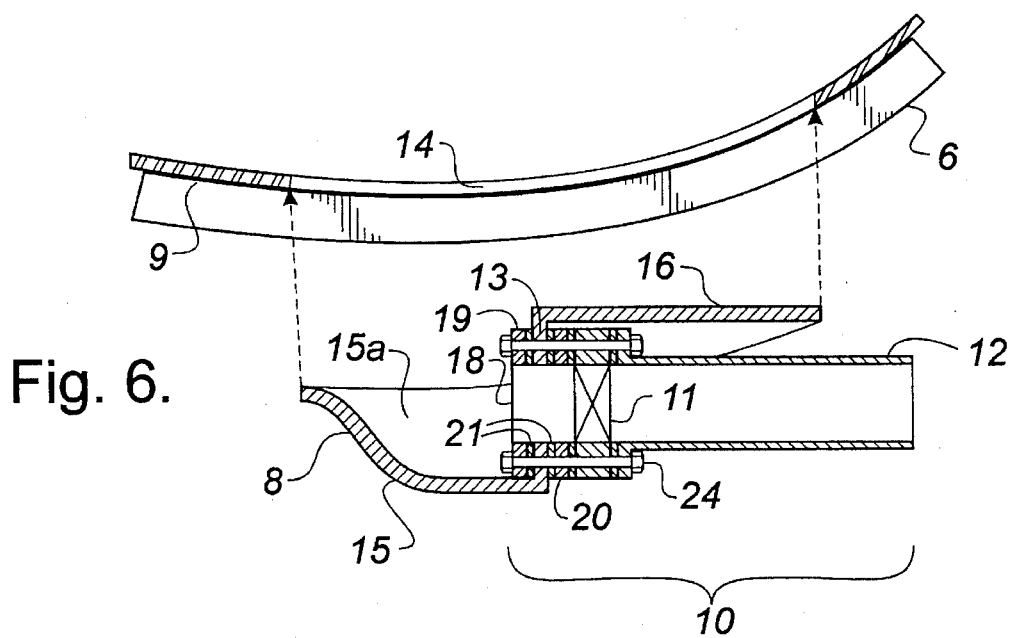

TRUCK MOUNTED TANK HAVING LOW CENTER OF GRAVITY

FIELD OF THE INVENTION

The invention relates to liquid cargo tanks of the type mounted for use on the frame of a truck.

BACKGROUND OF THE INVENTION

A cab and chassis-type truck is commonly fitted with an elongate, hollow, generally cylindrical, closed, horizontally extending, liquid cargo tank. These tanks have historically been fabricated of metal, commonly steel, aluminum or stainless steel, or fiberglass.

Many of the tanks provided for this service have been oval in cross-section, as this gave them a lower center of gravity in comparison to a tank having a circular cross-section.

In recent times, regulatory agencies have been requiring that liquid cargo tanks be formed with a circular cross-section, to obtain the benefit of the higher pressure rating. For example, in the United States, a tank for hauling acid has to have a pressure rating of at least 25 psi. To achieve pressure ratings above normal atmospheric pressure, a tank is usually formed with a circular cross-section. (Tanks of circular cross-section are commonly referred to as "round" tanks.)

Both oval and round liquid cargo tanks made in accordance with the prior art have a bottom discharge assembly for liquid removal (see FIG. 3). More particularly, an opening is formed in the bottom of the wall of the tank. A sump is made integral with the tank wall along the periphery of the opening. The sump has a downwardly facing end wall forming an outlet. A flat flapper valve is mounted to the bottom wall of the sump by inner and outer flanges held together by bolts. Piping is attached to the discharge end of the valve. The piping comprises a downwardly and horizontally projecting elbow and then a horizontal leg of pipe leading to a pump usually mounted on the side of the frame. The piping has to clear the top of the frame.

Using the most common size for outlet piping of 4" diameter, the closest the tank can be positioned to the frame is about 12 inches, to allow the discharge assembly to fit between tank and frame.

When a round tank is mounted in this way on a truck and is loaded, the tank has a relatively high center of gravity and there is a danger the truck may overturn. The danger is less with an oval tank, which has a lower center of gravity.

It is the objective of the present invention to modify oval and round tanks so that each can be cradled closer to the truck frame, to lower the center of gravity of the tank, while still providing the required discharge assembly and not interfering with the frame, drive shaft or the like.

SUMMARY OF THE INVENTION

The present invention relates to a modification of an elongate, hollow, closed, liquid cargo tank having an oval or round cross-section. The bottom side wall portion of the tank forms a liquid discharge opening. A sump is integral with the tank wall along the periphery of the opening. The sump extends downwardly from the tank wall and has a generally vertical wall segment at one end. The wall segment faces sideways—stated otherwise, it is generally parallel with the longitudinal axis of the tank. The wall segment forms an outlet which is positioned above the frame of the truck or trailer on which the tank is mounted. A discharge assembly is connected to the wall segment and extends generally horizontally and laterally toward the side of the vehicle.

In a preferred embodiment, the tank and sump are formed of fiberglass. The vertical wall segment of the sump has inner and outer annular flange and gasket assemblies mounted to its inner and outer faces. The flange assemblies extend around the outlet and are bolted together. The tank wall is upwardly recessed directly above the vertical wall segment and outer flange and they extend upwardly into the recess, thereby further reducing the spacing needed between tank and frame. By adopting this design, the spacing for a round tank has been reduced from about 12 inches to about 5 inches.

DESCRIPTION OF THE DRAWINGS

FIG. 3 is a simplified end view of a round tank equipped with a downwardly directed discharge assembly, in accordance with the prior art;

FIG. 4 is a simplified end view of a round tank having an indented wall and a horizontally directed discharge assembly, in accordance with the invention;

FIG. 5 is a partly sectional end view of the tank of FIG. 4;

FIG. 6 is a sectional exploded view showing the sump and flange assembly and the opening in the tank into which it is inserted for mounting to the tank.

DESCRIPTION OF THE PREFERRED EMBODIMENT

Figure 1:
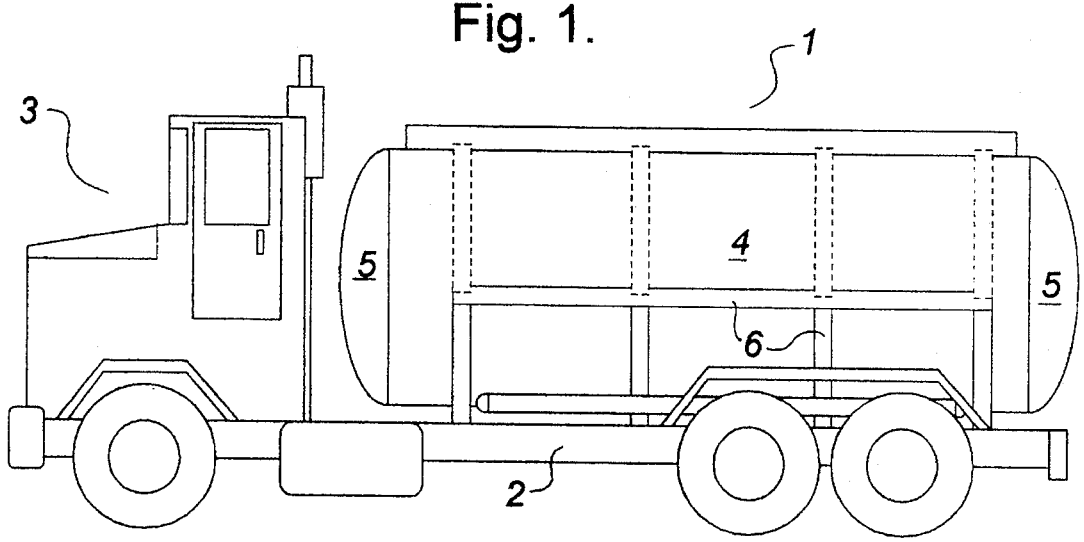
FIG. 1 is a side view showing a round tank mounted on a truck.
Figure 2:
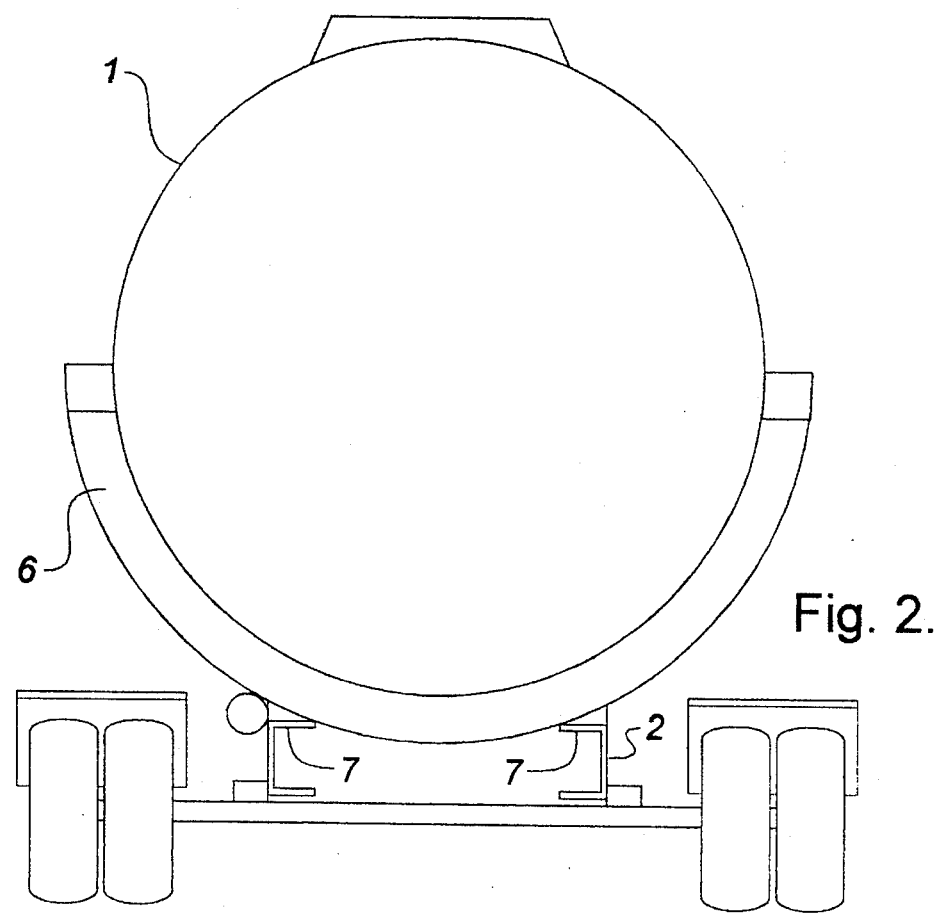
FIG. 2 is an end view showing the truck-mounted tank of FIG. 1.
Figure 7:
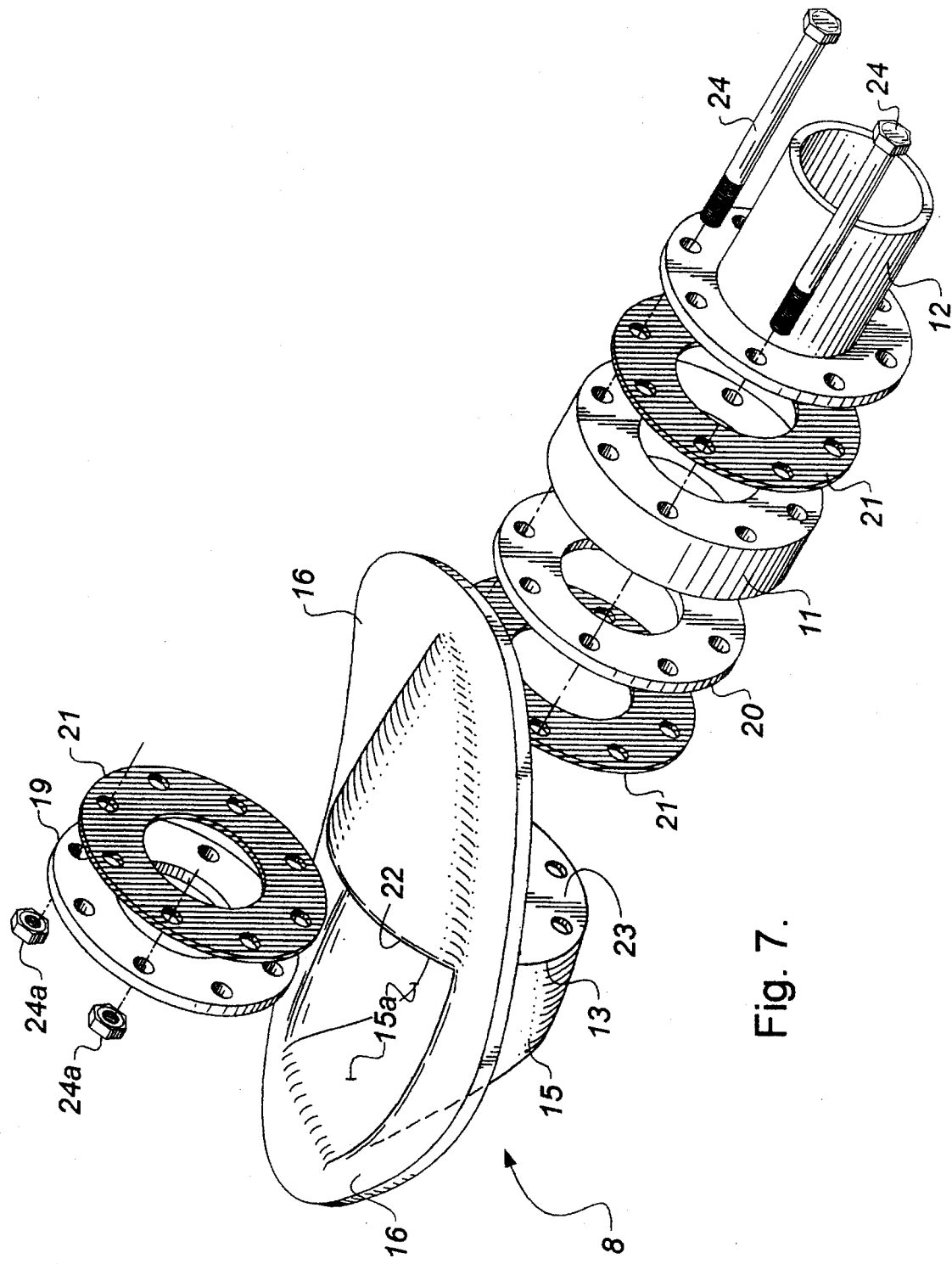
FIG. 7 is a perspective exploded view of the sump and flange assembly.

Having reference to the Figures, a tank 1 is shown mounted on the frame 2 of a cab and chassis-type truck 3. The tank 1 is formed of fiberglass. It is hollow, elongate and generally cylindrical, having a curved side wall 4 and end caps 5. A cradle 6, mounted on the frame 2, supports the tank 1 so that it extends horizontally, on its side, and is suspended above the rails 7 of the frame 2. A sump 8 extends downwardly from the tank's bottom wall portion 9. A discharge assembly 10, comprising a valve 11 and piping 12, extends generally horizontally from an apertured vertical wall segment 13 forming part of the sump 8.

In manufacturing the unit, a tank 1 is first formed and an oval opening 14 is provided in its bottom wall portion 9. A sump 8 is separately made and is subsequently bonded to or made integral with the bottom wall portion 9 around the periphery of the opening 14, so as protrude downwardly from the opening.

More particularly, the sump 8 comprises an open-topped duct 15 which, when viewed from the side, has a generally right-angle triangular shape. The duct 15 defines a passage 15a which communicates through the opening 14 with the tank compartment 32. Along its upper rim, the duct 15 has a laterally extending lip 16. At one end of the passage 15a, the duct 15 is closed by a vertical wall segment 13. The vertical wall segment 13 forms an outlet 18. This outlet 18 is positioned slightly above the rails 7 of the truck frame 2. Inner and outer flanges 19, 20 are secured to and sealed by gaskets 21 against inner and outer faces 22, 23 of the vertical wall segment 13. The flanges 19, 20 are secured in place by bolts 24. The flanges 19, 20 extend around the outlet 18.

The sump 8 is made integral with the tank bottom wall portion 9 along the periphery of the opening 14. This is done by inserting the sump 8 into the opening 14, as shown in FIG. 8, whereby the sump lip 16 seats on the inside surface of the bottom wall portion 9. The lip 16 and wall portion 9 are then coated with fiberglass to make them integral.

Alternatively, the sump 8 is manufactured simultaneously with the tank 4 using lamination processes commonly associated with the fiberglass manufacturing process, thereby eliminating the requirement for joints.

The lip 16 is upwardly arched or indented directly over the vertical wall segment 13 and flange 20, to create a recess 17. The wall segment 13 and flange 20 extend up into this recess 17. This arrangement permits the outlet 18 to be located closer to the tank's bottom wall portion 9, so that the tank 1 can be positioned closer to the rails 7 of the frame 2, while still enabling the piping 12 to extend horizontally and laterally without interfering with the frame 2.

The discharge assembly 10 is secured to the outer flange 20 and extends horizontally therefrom. More particularly, the discharge assembly 10 comprises a flanged valve 11 for controlling the discharge of liquid from the tank compartment 32. The valve 11 is secured to the flange 20 by bolts 24. Piping 12 is connected to the outlet end of the valve 11. The piping 12 extends horizontally over the rail 7 and out to the side of the truck 3, for conveying the liquid to a pump (not shown).

The embodiments of the invention in which an exclusive property or privilege is claimed are defined as follows:

1. A tank assembly for mounting on the frame of a vehicle for conveying liquid cargo, comprising:

an elongate, generally cylindrical, hollow tank formed of fiberglass and having an oval or circular cross-section, said tank having a curved side wall and end walls, said tank having at least one interior compartment, said side wall having a bottom portion when the tank is horizontally mounted on its side for use, said bottom portion forming an opening for discharging liquid from the compartment;

a hollow sump of fiberglass and integral with the wall bottom portion along the periphery of the opening, said sump protruding downwardly from the bottom portion, said sump having a generally vertical wall segment at one end, said wall segment forming an outlet for connection with a discharge assembly.

2. The tank assembly as set forth in claim 1 wherein:

the vertical wall segment extends generally parallel to the longitudinal axis of the tank.

3. The tank assembly as set forth in claim 2 wherein:

the vertical wall segment has an annular flange secured to its outer surface around the outlet for connection with a liquid discharge control valve; and the side wall bottom portion is upwardly indented to create a recess into which the vertical wall segment and flange extend to bring the vertical wall segment outlet close to the bottom portion.

4. The tank assembly as set forth in claim 3 wherein:

the sump has a generally horizontal lip extending outwardly from its upper edge, said lip having been made integral with fiberglass to the bottom wall portion at the periphery of the opening.

5. A tank assembly, for conveying liquid cargo, said assembly being mounted on the rails of a frame of a vehicle, comprising:

an elongate, generally cylindrical, hollow tank having an oval or circular cross-section, said tank having a curved side wall and end walls, said tank having at least one interior compartment, said tank being mounted horizontally and on its side on the frame, said side wall having a bottom portion, said bottom portion forming an opening for discharging liquid from the compartment;

a hollow sump, integral with the bottom portion along the periphery of the opening, said sump protruding downwardly from the bottom portion, said sump having a generally vertical wall segment on one side, said wall segment extending generally parallel to the longitudinal axis of the tank and forming an outlet positioned above the frame rails; and a discharge assembly, comprising a liquid discharge control valve and piping, connected with the vertical wall segment at the outlet, said discharge assembly extending generally horizontally and laterally of the tank.

6. The tank assembly as set forth in claim 5 wherein:

the tank and sump are formed of fiberglass.

7. The tank assembly as set forth in claim 6 comprising:

inner and outer flanges secured to the inner and outer surfaces of the vertical wall segment, said discharge assembly being connected with the outer flange; and wherein the bottom portion is upwardly indented to create a recess into which the vertical wall segment and outer flange extend to bring the vertical wall segment outlet close to the bottom portion.

8. The tank assembly as set forth in claim 7 wherein:

the sump has a generally horizontal lip extending outwardly from its upper edge, said lip having been made integral with fiberglass to the bottom wall portion at the periphery of the opening.

* * * * *